United States Patent [19]
Sievenpiper

[11] 3,885,800
[45] May 27, 1975

[54] SEAL RING SYSTEM

[75] Inventor: Ward Sievenpiper, Milgrove, N.Y.

[73] Assignee: A-T-O Inc., Willoughby, Ohio

[22] Filed: Dec. 28, 1973

[21] Appl. No.: 429,186

Related U.S. Application Data

[63] Continuation of Ser. No. 353,532, April 23, 1973, abandoned.

[52] U.S. Cl. ................................. 277/165; 267/1.5
[51] Int. Cl. ............................................. F16j 9/06
[58] Field of Search ........... 277/165, 192, 216, 164; 286/26; 267/1.5

[56] References Cited
UNITED STATES PATENTS

| | | | |
|---|---|---|---|
| 2,333,690 | 9/1943 | Smith | 267/1.5 |
| 2,937,061 | 5/1960 | Folkerts | 277/165 |
| 2,968,501 | 1/1961 | Tish | 286/26 |
| 3,149,848 | 9/1964 | Galloway | 277/165 |
| 3,149,849 | 9/1964 | Baldridge | 277/165 |
| 3,268,235 | 8/1966 | Jacobellis | 277/165 |
| 3,331,609 | 7/1967 | Moran | 277/165 |
| 3,614,114 | 10/1971 | Traub | 277/165 |
| 3,636,824 | 1/1972 | Clark | 277/165 |

Primary Examiner—Harry N. Haroian
Assistant Examiner—Robert I. Smith
Attorney, Agent, or Firm—Christel & Bean

[57] ABSTRACT

A seal ring system comprising an outer split ring and an inner expander ring both having axial lengths approximately the axial length of the groove in which they are disposed. The expander ring is formed of a material having a relatively high durometer rating to offer high resistance to axial deformation and possesses an irregularly shaped cross sectional outline to impose only a relatively light radial loading on the split ring under static sealing conditions while offering relatively high resistance to lateral deformation.

20 Claims, 5 Drawing Figures

PATENTED MAY 27 1975　　　　　　　3,885,800

SEAL RING SYSTEM

This is a continuation, of application Ser. No. 353,532 filed Apr. 23, 1973 and now abandoned.

This invention relates to seal rings for reciprocating members and, more particularly, to a seal ring system of composite design having a novel expander ring.

It is known to employ multiple-part sealing elements in reciprocating machines such as the conventional fluid actuated piston-cylinder arrangements for example. Many of these known multiple-element systems employ an outer split ring member of substantially non-deformable material adapted to engage the moving surface, such as a cylinder wall, and an inner deformable expander member, such as a rubber O-ring for example, engagable with the stationary surface of the piston. One problem encountered with the use of a deformable O-ring in conjunction with a split ring is that the O-ring deforms substantially and shifts axially in its groove relative to the outer split ring upon the application of axial pressure. This shifting often displaces the O-ring away from the parting line or gap defined by the split ends of the outer ring overlapping portions to allow fluid by-pass or leakage therethrough. In certain instances, in an effort to overcome this problem, expander rings having a rectangularly shaped cross sectional configuration and a length generally coextensive with the axial length of the groove in which they are to be used have been developed for use in lieu of the relatively soft and deformable O-rings. While such expander rings have minimized leakage in the area of the split ring parting gap because of the limited axial movement thereof under pressure, they tend to impart excessive initial radial loadings on the outer ring, even under static conditions, causing excessive wear and premature failure of the outer split ring.

SUMMARY OF THE INVENTION

Accordingly, an object of the present invention is to avoid the above problems by providing an improved seal ring system having a novel expander ring maintaining a positive seal against fluid leakage through the split ring parting gap while imposing only a moderate radial loading on the split ring under static sealing conditions.

Another object of this invention is to provide the foregoing in an arrangement offering high resistance to axial deformation of the expander element and resulting unbalance of the seal ring system.

Still another object of this invention is to provide the foregoing in an arrangement avoiding nibbling of the elastomeric expander ring.

The seal ring system of this invention is characterized by the provision of an expander ring formed of a material offering high resistance to axial deformation. The expander ring is formed with an annular outer bead of an arcuately shaped cross sectional configuration constantly engagable with the inner surface of the split ring in substantial radial alignment with the parting gap to prevent fluid leakage therethrough under all pressure conditions. The inner surface of the expander ring is provided with a pair of axially spaced annular ribs of arcuately shaped cross sectional configurations for engagement with the groove bottom wall providing a balanced static seal. The spacing between the inner ribs facilitates yielding of the outer bead to reduce the radial loadings imposed on the outer split ring.

The foregoing and other objects, advantages and characterizing features of the present invention will become clearly apparent from the ensuing detailed description of an illustrative embodiment thereof, taken together with the accompanying drawing wherein like reference characters denote like parts throughout the various views.

BRIEF DESCRIPTION OF THE DRAWING FIGURES

DETAILED DESCRIPTION OF AN ILLUSTRATED EMBODIMENT

Figure 1:
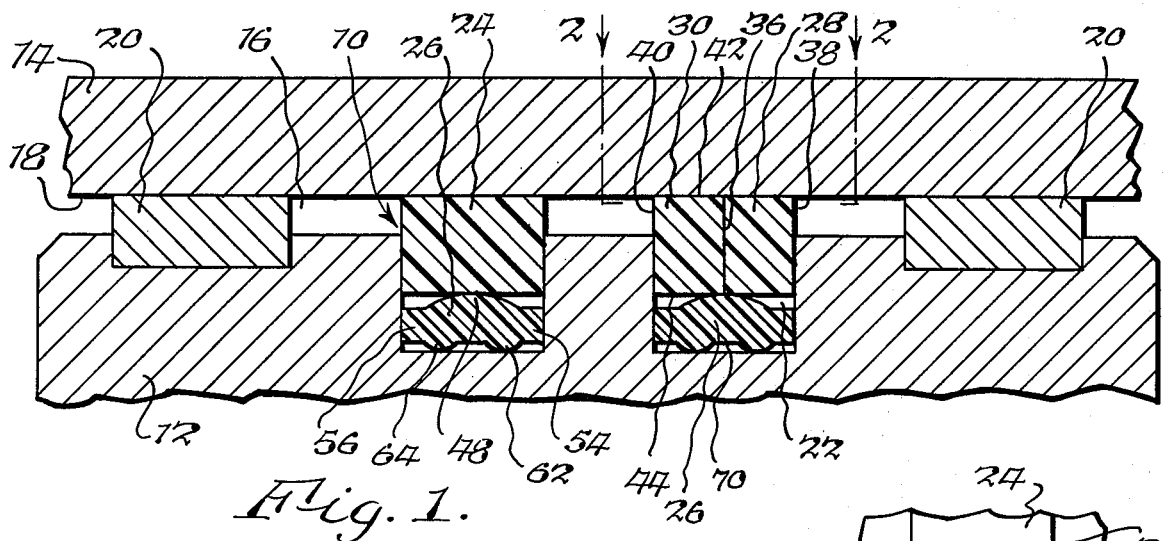
FIG. 1 is a fragmentary, longitudinal sectional view of a portion of an hydraulic cylinder incorporating seal ring systems of the present invention.
Figure 3:
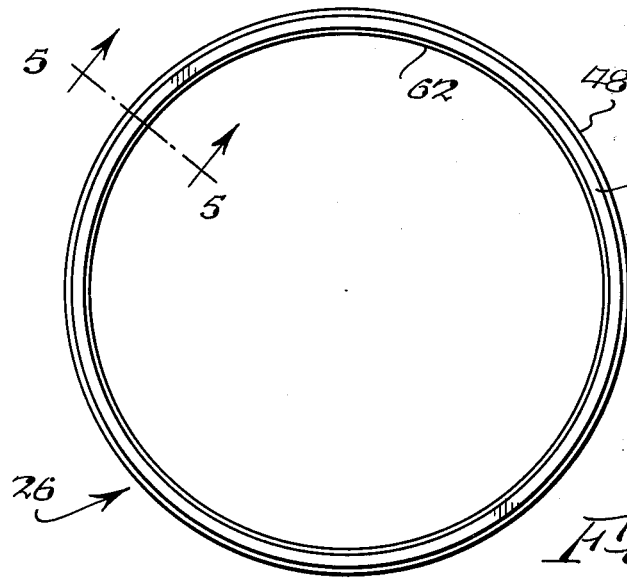
FIG. 3 is a side elevational view of the expander ring of the seal ring system of FIG. 1.

Referring now in detail to the illustrative embodiment depicted in the drawing, there is shown in FIG. 1 a pair of seal ring systems each generally designated 10, constructed in accordance with this invention and incorporated in a piston 12 mounted for reciprocating movement in an hydraulic cylinder 14 which can be of the single or double acting piston type. A small gap or clearance 16 exists between the inner wall surface 18 of cylinder 14 and the outer peripheral surface of piston 12. A pair of axially spaced sleeve type bearings 20 are mounted about piston 12 in bearing relation to cylinder wall surface 18.

As shown in FIG. 1, a pair of axially spaced grooves 22 are formed in piston 12, each such groove being defined by the bottom wall surface 22a and axially spaced-apart side wall surfaces 22b and 22c for receiving a sealing ring system 10. Of course, more or less than two sealing ring systems 10 can be provided in piston 12, as desired. Also, the piston construction can vary, depending on the particular application.

In accordance with this invention, seal ring system 10 comprises an outer, annular, split sealing element or ring 24 and an endless, inner, annular sealing element and expander 26. Outer ring 24 bears against the cylinder inner wall surface 18 in sliding engagement therewith to provide a dynamic fluid tight seal between such surface 18 and piston 12 and inner expander ring 26 is effective to urge ring 24 radially outwardly under pressure to force the outer surface thereof into tight sealing engagement with inner wall surface 18 of cylinder 14.

Outer ring 24 preferably is formed of the polyamide commonly known as Nylon and which is provided with a filler including glass fibers in an amount constituting about 30 percent by weight of the ring composition and molybdenum disulfide in an amount constituting about 5 percent by weight of the total ring material. The glass fibers add strength to the Nylon, lengthening its useful wear life, and the molybdenum disulfide adds lubricity. While the above weight proportions of filler material are preferred, it has been found that the addition of glass fibers in a range of about 12 to 30 percent and molybdenum disulfide in a range of about 2 to 5 percent by total weight produces satisfactory results.

Nylon is preferred as the basic ring material because of its non-galling property. Also, Nylon has the capability of absorbing metallic impurities present in hydraulic fluid and which otherwise would score and damage the cylinder. In addition, when Nylon is provided with the appropriate filler, it exhibits thermosetting characteristics, becoming permanently hard and rigid when heated or cured, and will remain stable at temperatures up to 400°F and pressures up to 4,000 p.s.i., these conditions being well above those normally encountered in use. Ring 24 is molded to provide a protective skin against moisture and temperatures, which under extreme conditions can render the ring material deformable. Although the ring material preferably is Nylon, it should be understood that other synthetic materials having similar thermosetting exhibiting properties and which do not exhibit "cold flow" under the temperature and pressure conditions normally encountered can be used in lieu of Nylon, if desired, within the purview of this invention.

Figure 2:
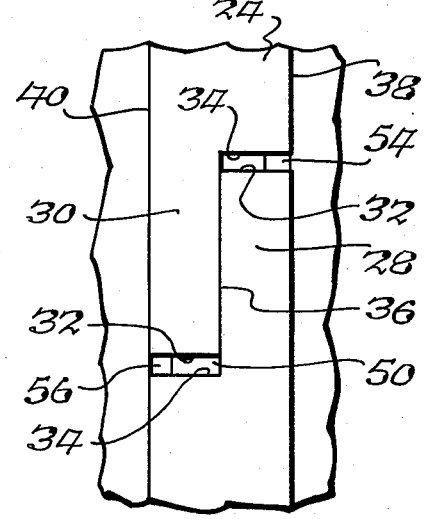
FIG. 2 is a fragmentary, enlarged face or plan view of a portion of the seal ring system, taken about on line 2—2 of FIG. 1.
Figure 4:
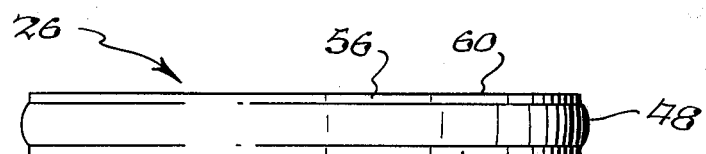
FIG. 4 is a face or plan view of the expander ring of FIG. 3.

As shown in FIG. 2, split ring 24 is formed with a pair of offset overlapping end portions 28 and 30 in a manner providing a stepped lap joint construction to minimize the bypass of liquid as contrasted with a simple split defined by straight, transverse edges. The overlapping portions 28 and 30 are provided with end faces 32 adapted to abut recessed abutment shoulders 34 in the closed position of ring 24. These overlapping portions 28 and 30 define therebetween a parting line or gap 36 extending parallel to the axial end faces of ring 24.

Outer split ring 24 has parallel axial end faces 38 and 40, an outer annular bearing surface 42, and an inner annular surface 44, the surfaces 42 and 44 meeting end faces 38 and 40 at sharp, right-angle edges. The axial length of outer ring 24 is substantially the axial length of groove 22 with only a slight clearance existing between end faces 38 and 40 and groove side wall surfaces 22b and 22c when subjected to axial pressures in either direction. As shown in FIG. 1, inner surface 44 is spaced somewhat from bottom wall surface 22a to accommodate inner expander ring 26.

Expander 26 is formed of a synthetic plastic material of a relatively high durometer rating, such as urethane for example. Such material, while softer than the material of which ring 24 is composed, is of a substantially higher durometer rating, for example 90, than the conventional, deformable rubber O-rings often used as expander elements in such seal ring systems.

Figure 5:
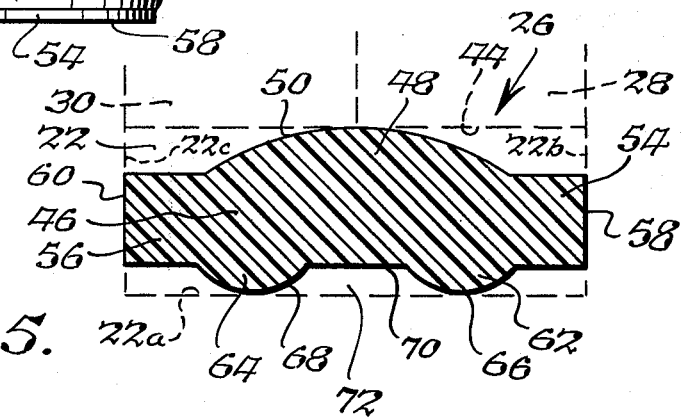
FIG. 5 is a transverse sectional view thereof, on an enlarged scale, taken about on line 5—5 of FIG. 3.

Expander 26 comprises an endless, annular body 46 adapted to be positioned in the annular space defined by the groove walls 22a, 22b, 22c and inner surface 44 of outer split ring 24. As best shown in FIG. 5, the outer surface of body 46 is formed with a central, annular bead 48 having an arcuately-shaped bearing surface 50 for sealing engagement against inner surface 44 of outer ring 24. In use, bearing surface 50 of expander 26 is pressed against inner surface 44 of outer ring 24 adjacent the area of parting gap 36 to define an annular sealing band having an axial width extending on opposite sides of parting gap 36 to insure a positive fluid tight seal thereagainst at all times.

Body 46 also is formed with a pair of axial end portions 54 and 56 projecting laterally outwardly from bead 48 and having end faces 58 and 60 engagable with groove side wall surfaces 22b and 22c. The axial length of expander 26 approximates the axial length of groove 22 with only slight clearance existing between faces 58, 60 and wall surfaces 22b and c, and it is a feature of my invention that because of the high durometer material of which expander 26 is formed, it is not particularly deformed axially even under high pressure conditions whereby bead 48 remains substantially centered within groove 22 in radial alignment with parting gap 36 to prevent fluid leakage beneath outer ring 24, thereby ensuring hydraulic loading against the axial end face 38 or 40 of ring 24 to eliminate clearance along parting line 36 and thereby prevent fluid leakage through the ring by blocking flow between gaps 54 and 56. Expander ring 26 also is hydraulically loaded thereby increasing the radial loading on outer ring 24 and the resulting sealing force against surface 18, all in proportion to the system pressure.

The inner surface of body 46 is provided with a pair of relatively small annular ribs 62 and 64 axially spaced from each other and having arcuately shaped bearing surfaces 66 and 68 engagable with groove bottom wall 22a to form a static seal therewith. As shown in FIG. 5, the inner ribs 62 and 64 are axially offset from bead 48 so that a transaxial plane cut through the center of the latter is disposed midway between the inner ribs 62 and 64. These ribs 62 and 64 define a land portion 70 radially spaced from groove bottom wall surface 22a providing a clearance 72 therebetween, enabling bead 48 to radially yield inwardly somewhat, thereby offering only moderate resistance to radial movement and reducing the stresses on outer ring 24 while effectively resisting axial deformation. Under static sealing conditions, expander ring 26 imposes only a relatively light radial load on outer ring 24, created by triangular three point contact, as opposed to the more severe initial loading that would be offered by a rectangularly shaped cross sectional expander ring of similar durometer rating completely filling the space of groove 22, for example. However, the radial loading increases under dynamic sealing conditions in proportion to the hydraulic forces encountered. Accordingly, increased loading on outer ring 24 is obtained when needed most to provide a firmer pressure sealing engagement against inner wall surface 18 of cylinder 14. Nibbling of expander ring 26 is precluded by the reduction of clearance of gap 36 to zero under hydraulic loading. Because of its rigidity, expander ring 26 offers high resistance to axial movement, but only moderate resistance to radial movement because of its specially configured cross sectional shape. The engagement of expander ring 26 with inner surface 44 of outer ring 24 and groove bottom wall 22a at three axially offset points, namely bead 48 and ribs 62 and 64, balances expander ring 26 to prevent cocking or tilting of the latter under the influence of fluid pressure.

When rings 24 and 26 are assembled together and positioned in piston groove 22, at best shown in FIG. 1, the resulting seal ring system 10 maintains an effective fluid seal under both low and high pressure conditions while possessing low initial friction characteristics and no susceptibility to destructive pressure deformation. Expander ring 26 is captively received within the space defined between outer ring inner surface 44 and groove bottom wall 22a and urges the bearing surface 42 of outer ring 24 radially outwardly into a fluid-tight, slidable sealing engagement with the inner wall surface 18 of cylinder 14. The sharp, right angular edges formed by the intersection of end faces 38 and 40 with bearing surface 42, respectively, enhances this sealing engagement and also provides an effective wiping edge.

Bead 48 of expander ring 26 provides a static seal against inner surface 44 of outer ring 24 while ribs 62 and 64 provide a static seal against the groove bottom wall 22a.

In illustrating the operation of seal ring system 10, assume that fluid under pressure is applied to the right side of piston 12, as viewed in FIG. 1, urging the same toward the left. The axial lengths of rings 24 and 26 are generally coextensive with and only slightly less than the axial length of groove 22. Thus, fluid pressure entering clearance 16 and acting on end face 38 of outer ring 24 causes ring 24 to move slightly axially to the left within groove 22. Of course, the extent of axial movement of ring 24 is small due to the minute clearance between outer ring end faces 38 and 40 and the opposite side wall surfaces 22b and 22c of groove 22. However, this slight axial movement is sufficient to allow fluid under pressure to enter groove 22 and flow between expander ring end face 58 and groove side wall 22b to act on expander ring 26 and deform the same radially, urging outer split ring 24 into firmer pressure sealing engagement against the inner wall surface 18 of cylinder 14 providing a tight dynamic seal therebetween. Also, the static seal between rib 62 and groove bottom wall surface 22a is made tighter.

In addition, the fluid pressure acting on expander ring 26 moves the same slightly axially to the left along with outer split ring 24, thus maintaining bearing surface 50 of bead 48 substantially radially aligned with parting gap 36 of split outer ring 24. Even if parting gap 36 should become slightly misaligned relative to the center of bead 48, there is a sufficiently wide bearing surface area of bead 48 in sealing contact with inner surface 44 of ring 24 to accommodate such slight misalignment and maintain an effective fluid tight static seal thereagainst to prevent any leakage through parting gap 36. Seal ring system 10 seals in an equally effective manner against fluid pressure acting in an opposite direction from that described above.

The axial end face 40 of split ring 24 is pressed into firmer contact with groove sidewall 22c as a result of the slight axial movement of split ring 24. As shown in FIG. 1, the radial thickness or depth of ring 24 is sufficiently large to provide a relatively large area, as defined by end faces 38 and 40, exposed to axial loading under fluid pressure, thereby increasing the overall structural rigidity of seal ring system 10. This enables the plastic material of which ring 24 is formed to more effectively resist "cold flow" under high fluid pressure conditions. Moreover, such large exposed area end faces enhance the effectiveness of seal ring system 10 in contaminated hydraulic systems for the following reason. For a hydraulic system to properly handle contaminated fluids, the width of clearance 16 between piston 12 and cylinder wall surface 18 should be relatively large. To this end, the large exposed areas of ring end faces 38 and 40 increase the rigidity of seal ring system 10 against the increased axial stresses resulting from the larger clearance and also provide more surface area for exposure to the fluid to absorb the contaminating particles.

While expander ring 26 shifts slightly axially under axial loading and expands slightly radially under the influence of fluid pressure, it does not deform significantly because of the high durometer rating of the material of which it is formed. This maintains bead 48 in substantial radial alignment with parting gap 36 to prevent any fluid bypass as previously explained. Also, because axial loading of outer ring 24 reduces the clearance of gap 36 to zero, extrusion or nibbling of the elastomer element 26 is effectively eliminated, thereby resulting in longer life, greater reliability even under high shock loading, and elevated temperature applications. At the same time, because of the specially configurated cross section of expander ring 26, it imparts only moderate radial loading against outer ring 24, thereby minimizing wear of outer ring 24.

From the foregoing, it is apparent that the objects of the present invention have been fully accomplished. While an illustrative embodiment of this invention has been described in detail, it should be understood that this has been done by way of illustration only without thought of limitation.

I claim:

1. A sealing ring system comprising: an annular outer member of non-deformable material adapted to be received in a peripheral groove formed in a reciprocating member in spaced relation to the bottom wall of said groove; an annular inner expander member adapted to be received in said groove between said groove bottom wall and said outer member for urging the latter into pressure sealing engagement against the surface to be sealed; said expander member being formed of a material providing relatively high resistance to axial deformation and having an irregularly shaped outline in cross sectional configuration defining a peripheral bead on one surface thereof and a pair of axially spaced inner peripheral ribs on the other surface in sealing engagement with said outer member and said groove bottom wall surface, respectively, to impart a relatively light radial loading on said outer member under static sealing conditions.

2. A sealing ring system according to claim 1 wherein said outer member and said expander member are substantially axially coextensive with each other and with the axial length of said peripheral groove.

3. A sealing ring system according to claim 1 wherein said outer member is split and is provided with overlapping end portions defining a parting gap therebetween in parallelism with the axial end faces of said outer member; said expander member bead engagable with the inner surface of said split ring in substantial radial alignment with said parting gap.

4. A sealing ring system according to claim 1 wherein said expander member ribs are axially offset from said bead and engagable with said groove bottom wall.

5. A sealing ring system according to claim 4 wherein said inner ribs define a clearance therebetween in radial alignment with said bead enabling the same to yield radially inwardly.

6. A sealing ring system according to claim 1 wherein said expander member is formed of urethane.

7. A sealing ring system according to claim 1 wherein said expander member is substantially axially coextensive with said outer member and said peripheral groove; said outer member being split and provided with overlapping end portions defining a parting gap therebetween in parallelism with the axial end faces of said outer member; said expander member bead engagable with the inner surface of said split ring in substantial radial alignment with said parting gap and said expander member ribs being axially offset from said outer bead and engagable with said groove bottom wall; said ribs defining a clearance therebetween in radial alignment with said bead enabling the latter to yield slightly radially inwardly.

8. A sealing ring system according to claim 1 wherein said expander member is formed with a pair of axial end portions projecting laterally outwardly from said bead and having end faces engageable with the side wall surfaces of said groove.

9. A sealing ring system according to claim 8, wherein said end faces are flat.

10. A sealing ring system according to claim 8, wherein said expander member ribs are axially spaced from said end faces.

11. A sealing ring system according to claim 1, wherein said expander member comprises a body of generally rectangular cross section wherein the opposite ends thereof provide end faces engageable with the side wall surfaces of said groove and said peripheral bead is formed on one side thereof and said ribs are formed on the other side thereof.

12. A sealing ring system according to claim 11 wherein said ribs are spaced inwardly of said end faces.

13. An expander ring for use in a seal ring system adapted to be retained in a peripheral groove of a reciprocating member comprising: an endless annular body formed of a material of a relatively high durometer rating; said body having an axial length substantially coextensive with the axial length of the groove in which it is to be retained; a pair of end portions extending axially outwardly from said body and terminating in end faces engagable with the opposite side walls of such groove; said body having a peripheral bead on one side surface thereof centrally of said body engagable with an outer bearing ring and a pair of axially spaced peripheral ribs on the other side thereof axially offset from said bead and from said end faces and engagable with the bottom wall of such groove.

14. An expander ring according to claim 13 wherein said expander ring is formed of urethane.

15. An expander ring according to claim 13, wherein said ribs and said bead have arcuately shaped bearing surfaces, and said ribs are relatively small compared to said bead.

16. A sealing ring system comprising: an annular seal member adapted to be received in a peripheral groove formed in a reciprocating member in spaced relation to the inner wall of said groove, said seal member being split and provided with overlapping end portions definng a parting gap therebetween in parallelism with the axial end faces of said sealing member and which parting gap is reduced to zero under hydraulic loading; and an annular expander member adapted to be received in said groove between said groove inner wall and said seal member for urging the latter into pressure sealing engagement against the surface to be sealed, said expander member having a bearing surface for sealing engagement against said seal member adjacent the area of said parting gap, said expander member being of a material having a relatively high durometer rating sufficient to resist axial deformation under high pressure conditions whereby said bearing surface remains in alignment with said parting gap.

17. A sealing ring system according to claim 16, wherein said seal member is of non-deformable material.

18. A sealing ring system according to claim 16, wherein said expander member is of synthetic plastic material having a durometer rating of at least about 90.

19. A sealing ring system according to claim 16, wherein said expander member has an irregularly shaped outline in cross sectional configuration defining a peripheral bead on one surface thereof and a pair of axially spaced inner peripheral ribs on the other surface in sealing engagement with said seal member and said groove inner wall surface, respectively, to impart a relatively light radial loading on said seal member under static sealing conditions.

20. An expander ring for use in a seal ring system adapted to be retained in a peripheral groove of a reciprocating member comprising: an endless annular body of generally rectangular cross section having an axial length substantially coextensive with the axial length of the groove in which it is to be retained and a radial width substantially less than the radial dimension of said groove, a central bead providing a relatively wide bearing surface area on one side of said body, and relatively small axially spaced annular ribs on the opposite side of said body.

* * * * *